United States Patent
Roberts et al.

(10) Patent No.: US 7,437,153 B2
(45) Date of Patent: Oct. 14, 2008

(54) APPARATUS AND METHOD FOR TAKING MEASUREMENTS IN UNIVERSAL MOBILE TELECOMMUNICATIONS SYSTEM USER EQUIPMENT

(75) Inventors: Gideon Roberts, Staffordshire (GB); Nicola Funnell, Warwickshire (GB)

(73) Assignee: M-Stack Limited, Birmingham (GB)

( * ) Notice: Subject to any disclaimer, the term of this patent is extended or adjusted under 35 U.S.C. 154(b) by 572 days.

(21) Appl. No.: 10/760,323

(22) Filed: Jan. 20, 2004

(65) Prior Publication Data

US 2005/0159147 A1     Jul. 21, 2005

(51) Int. Cl.
*H04Q 7/20* (2006.01)
*H04B 17/00* (2006.01)

(52) U.S. Cl. .................. 455/423; 455/434; 455/67.11; 455/456.1; 455/525; 455/450; 455/437; 455/439; 455/453; 370/331; 370/332; 370/338

(58) Field of Classification Search ............... 455/423, 455/422, 226, 67.11–67.7, 525, 453, 450, 455/452, 509, 434–439, 413, 456.1, 411, 455/435.2, 513; 370/342, 468, 331, 332, 370/338

See application file for complete search history.

(56) References Cited

U.S. PATENT DOCUMENTS 5,757,772 A * 5/1998 Thornberg et al. .......... 370/236

6,640,105 B1    10/2003 Shin
6,963,745 B2 * 11/2005 Singh et al. ................. 455/437
2003/0218995 A1 * 11/2003 Kim et al. .................... 370/318

FOREIGN PATENT DOCUMENTS

EP          0 892 571 A2     1/1999

OTHER PUBLICATIONS

ETSI TS 125 331; Universal Mobile Telecommunications System (UMTS); RRC Protocol Specification (3G TS 25.331 v. 3.1.0 Rel. 1999); Jan. 2000.
ETSI TS 125 302; Universal Mobile Telecommunications System (UMTS); Services provided by the physical layer (3GPP TS 25.302 v. 5.5.0 Rel.5), no date listed.

* cited by examiner

*Primary Examiner*—Charles N Appiah
*Assistant Examiner*—Emem Stephen

(57) ABSTRACT

A method and apparatus for taking measurements in a mobile telecommunications system are disclosed, the system comprising a network of a plurality of cells and at least one user equipment device. The method comprises, at the user equipment device, receiving a measurement control set-up command and, in response the user equipment device, setting up the measurements. Then it monitors for a change in state of the UE and, in response to a change in state, issuing a measurement control pause command and, in response, the user equipment device stopping taking measurements, and maintains the measurement settings initialised previously. The device then monitors for a change in state of the UE and, in response to a change in state, issuing a measurement control resume command and, in response, the user equipment device resumes taking measurements with the maintained measurement settings.

3 Claims, 5 Drawing Sheets

APPARATUS AND METHOD FOR TAKING MEASUREMENTS IN UNIVERSAL MOBILE TELECOMMUNICATIONS SYSTEM USER EQUIPMENT

BACKGROUND

1. Technical Field

This application relates to UMTS (Universal Mobile Telecommunications System) in general, and to an apparatus and method for taking measurements in universal mobile telecommunications system user equipment.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardisation bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardisation body, specific partners publish and set standards in their respective areas.

Consider a wireless mobile device, generally referred to as user equipment (UE), that complies with the 3GPP specifications for the UMTS protocol. The 3GPP 25.331 specification, v.3.16.0, referred to herein as the 25.331 specification, addresses the subject of the Radio Resource Control (RRC) protocol specification. The 3GPP 25.304 specification, v.3.16.0, referred to herein as the 25.304 specification, addresses the subject of UMTS User Equipment (UE) procedures in idle mode and procedures for cell reselection in connected mode between the UMTS Terrestrial Radio Access Network (UTRAN) and the UE. The 3GPP 25.302 specification, v.3.16.0, referred to herein as the 25.302 standard, addresses the subject of services provided by the physical layer of UTRA to upper layers.

A UE undertakes frequent measurement procedures. Clause 8.4 of the 25.331 standard and its sub-clauses and clause 14 and its sub-clauses relate to the measurement procedures to be undertaken by the UE as do clause 5.2.3.1a and its sub-clauses of the 25.304 specification. The 25.331 standard (and in particular clauses Clause 8.4 and its sub-clauses and clause 14 and its sub-clauses), the 25.304 standard (and in particular clauses 5.2.3.1 and its sub-clauses) and the 25.302 standard are incorporated herein by reference.

A UTRAN requires a UE to make measurements of its environment (for example the signal strength received from the UTRAN) and report this data back to the UTRAN so that it may control the UEs appropriately. The UTRAN instructs the UE which measurements it is required to make by sending it a MEASUREMENT CONTROL command. This command is detailed in the 25.331 standard, clause 8.4.1.

It is specified that the MEASUREMENT CONTROL command has three commands:

Set-up—The UE must initialise the measurement and start taking results.

Modify—The UE must change the measurement settings and continue to take results.

Release—The UE must stop taking measurements and delete the measurement settings.

It is also specified that certain measurements are only valid when the UE is in certain states. For example an Intra-frequency measurement is only valid when the UE is in state Cell_DCH. If the UE moves from Cell_DCH to Cell_FACH, then the UE must stop taking the intra-frequency measurements. However, the measurement settings must be retained in the UE because when the UE returns to Cell_DCH, then it must resume taking the intra-frequency measurements again (provided that in the meantime, the UTRAN has not issued a Release command). Conventionally these measurement settings are retained in the RRC layer but the Layer 1 does not retain any measurement settings.

In a UE, it is the RRC layer which receives the UTRAN MEASUREMENT CONTROL command and instructs the Layer 1 to set-up, change or release any particular measurement. The UE is required to stop and restart the measurement without further commands from the UTRAN. For instance, the RRC may change state very briefly (for instance to send a Cell Update message) and then return to the original state. This necessitates a Release command followed by a Set-up command.

The interface between the RRC and layer 1 is described in 3GPP specification TS25.302 v3.16.0, clauses 10.2.1.3 and 10.2.1.4. Although there are no commands specified in this document, it is natural to use the same set of commands as used in the UTRAN-UE interface.

The Layer 1 does not know what state the UE is in and, for instance, when moving from Cell_DCH to Cell_FACH, the RRC must instruct the Layer 1 to stop taking the measurements and so would use a Release command. When the UE moves back to Cell_FACH, the RRC must tell the Layer 1 to start taking measurements again and so uses the Set-up command.

This results in all the settings for the measurement being sent again to the Layer 1 and the Layer 1 having to initialise the measurement again before any results can be taken.

There are thus proposed strategies for User Equipment (UE) measurement procedures and in particular the RRC protocol. A number of such strategies are detailed below.

Other aspects and features of the present invention will become apparent to those ordinarily skilled in the art upon review of the following description of specific embodiments of an apparatus and method for carrying out User Equipment (UE) measurements in connected mode.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

A method and apparatus for taking measurements in universal mobile telecommunications system user equipment are described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for taking measurements in a mobile telecommunications system are disclosed, the system comprising a network of a plurality of cells and at least one user equipment device. The method comprises, at the user equipment device, receiving a measurement control set-up command and, in response the user equipment device, setting up the measurements. Then it monitors for a change in state of the UE and, in response to a change in state, issuing a measurement control pause command and, in response, the user equipment device stopping taking measurements, and maintains the measurement settings initialised previously. The device then monitors for a change in state of the UE and, in response to a change in state, issuing a measurement control resume command and, in response, the user equipment device resumes taking measurements with the maintained measurement settings.

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
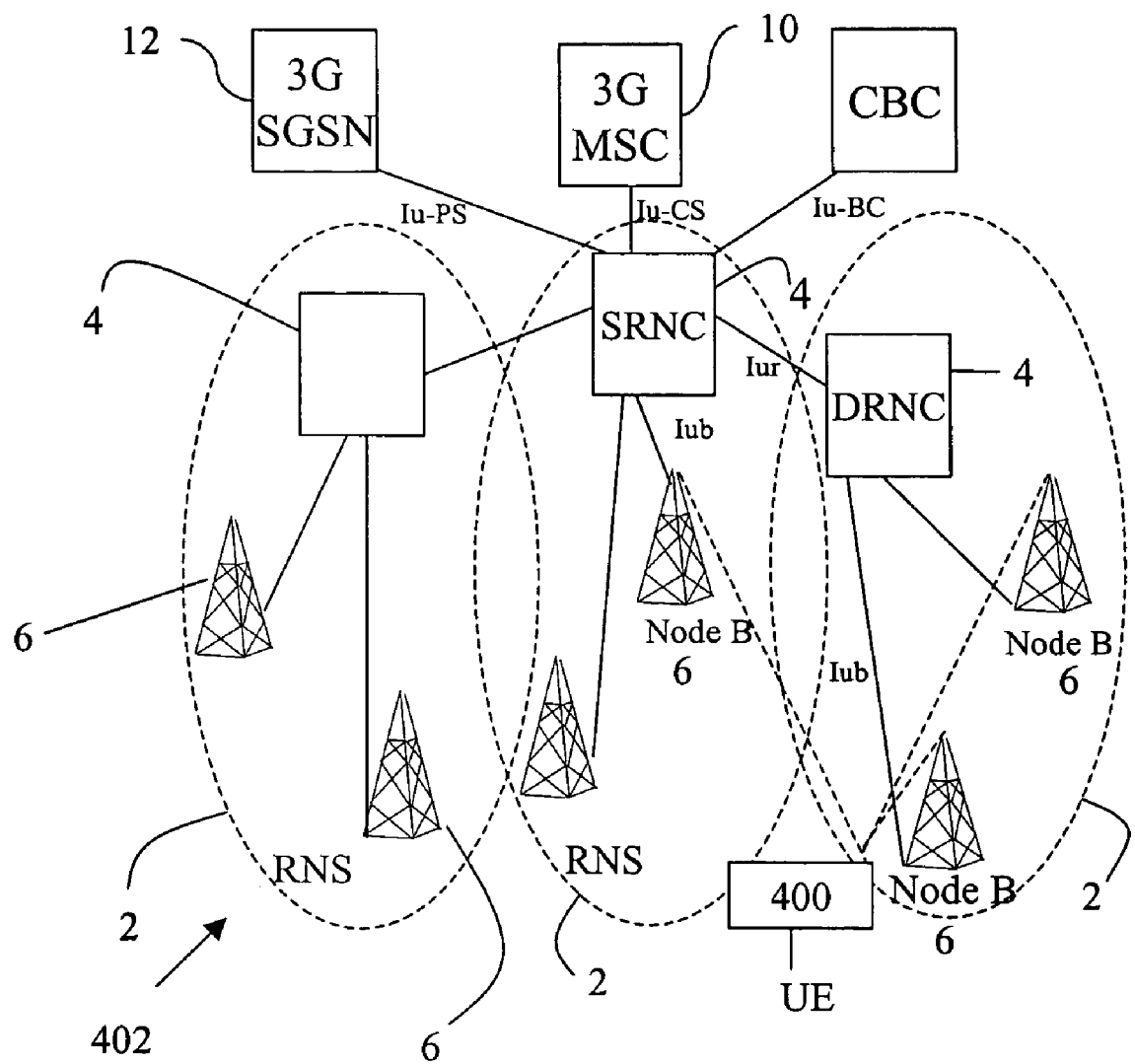
FIG. 1 shows an overview of a network and UE device.

FIG. 1 shows an overview of a network and a UE device. Clearly in practice there may be many UE devices operating with the network but, for the sake of simplicity, FIG. 1 only shows a single UE device 400. For the purposes of illustration, FIG. 1 also shows a network 402 having a few components. It will be clear to a person skilled in the art that in practice a network will include far more components than those shown.

FIG. 1 shows an overview of the radio access network 402 (UTRAN) used in a UMTS system. The network 402 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 400 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Figure 2:
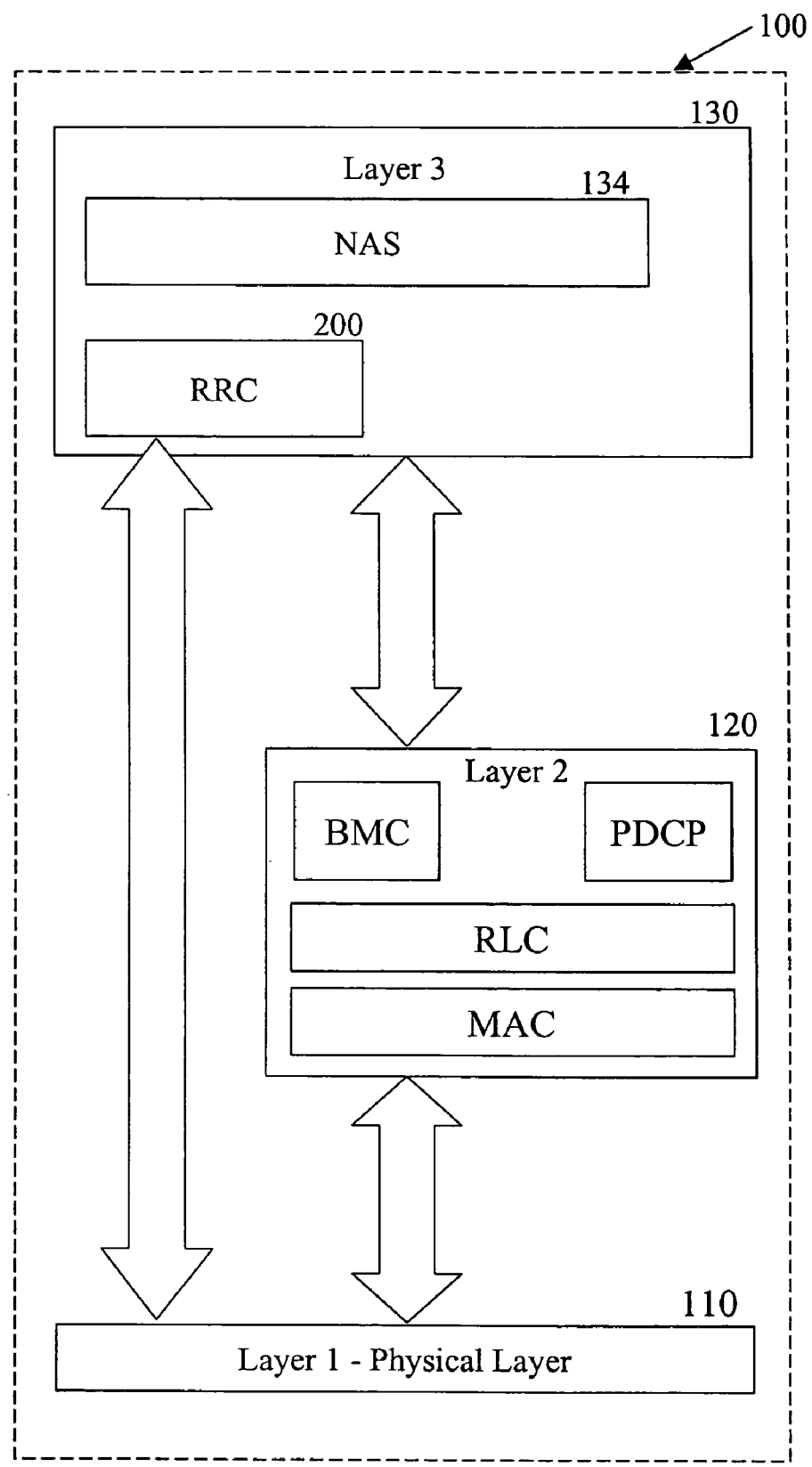
FIG. 2 is a block diagram illustrating an embodiment of a protocol stack apparatus provided with a RRC block, in accordance with the present application.

FIG. 2 is a block diagram illustrating an embodiment of a UMTS protocol stack 100 of a UE device. The RRC block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 110 and Layer 2 120. When the UTRAN wishes to change the UE configuration it will issue a message to the UE containing a command to invoke a specific RRC procedure. The RRC 200 layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

As discussed above, a UTRAN requires a UE to make measurements of its environment (for example the signal strength received from the UTRAN) and report this data back to the UTRAN so that it may control the UEs appropriately. The UTRAN instructs the UE which measurements it is required to make by sending it a MEASUREMENT CONTROL command. This command is detailed in the 25.331 standard, clause 8.4.1.

In the 25.302 standard, the Request primitive CPHY-Measurement-REQ is used by the RRC to configure L1 measurements. We propose that the CPHY-Measurement-REQ command signal from the RRC layer to the Layer 1 has two additional commands:

Pause—The Layer 1 stops taking measurements, but leaves the measurement settings initialised.

Resume—The Layer 1 continues to take measurements.

By using these commands the UE can avoid having to delete and reinitialise the measurement when a state change occurs.

Thus the RRC layer 200 sends a message to the Layer 1 to Pause or Resume the measurements. In response, the Layer 1 pauses the measurements whilst retaining the measurements made so far and then resumes from this point respectively.

Figure 3:
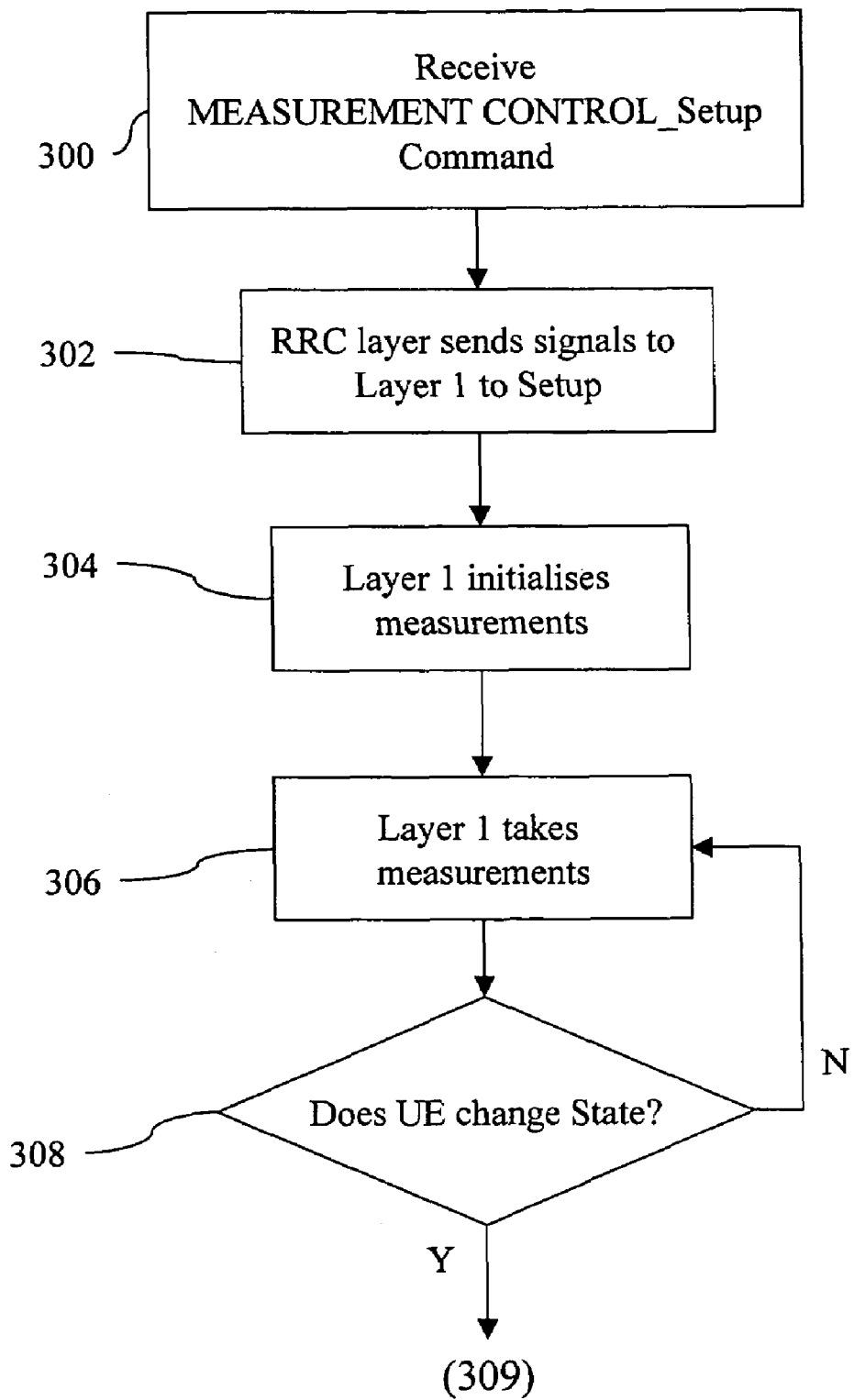
FIG. 3 is a flow diagram illustrating a first embodiment.
Figure 3:
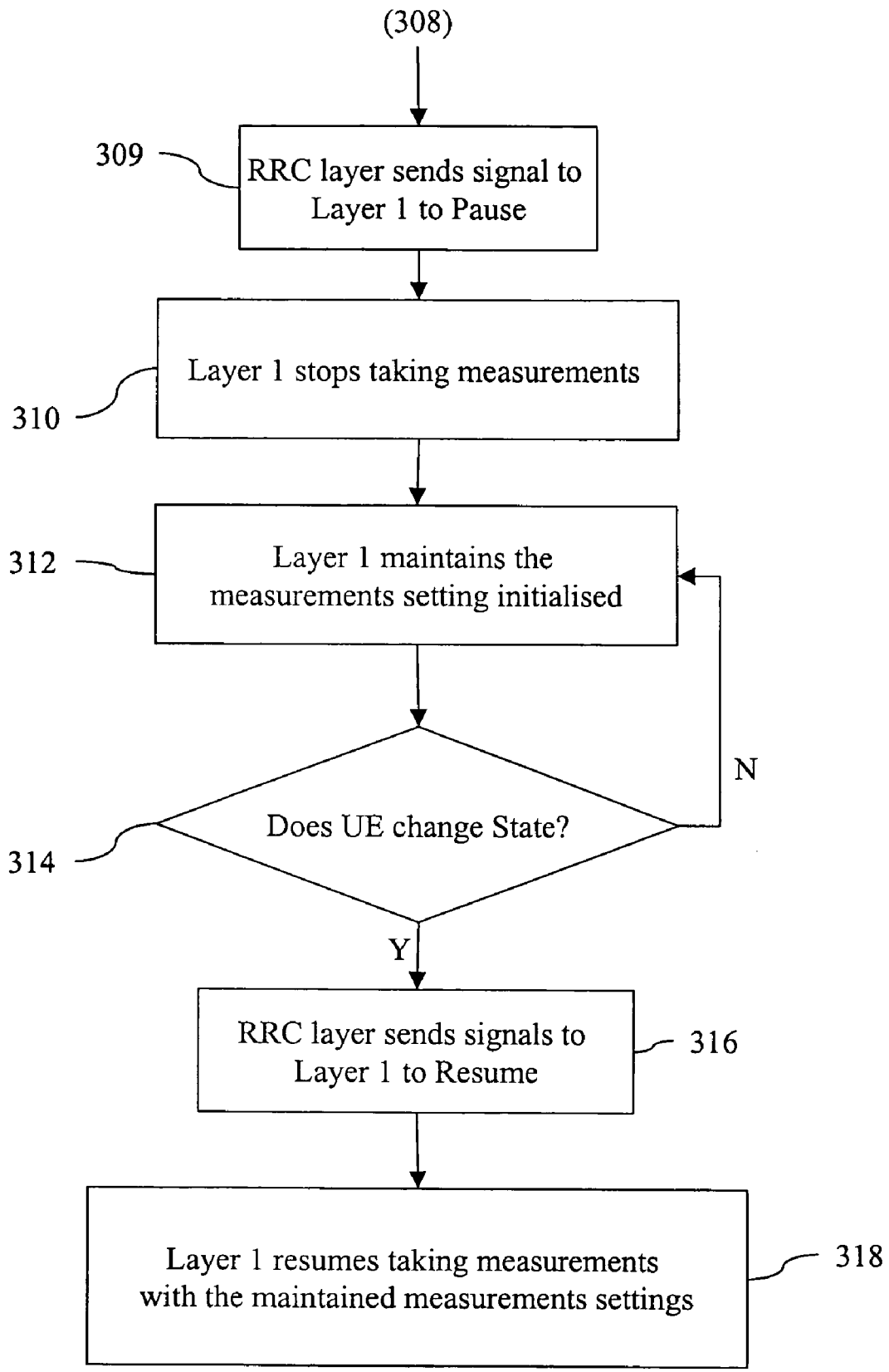

This is illustrated in FIG. 3 which is a flow diagram illustrating operation of an embodiment of a UE.

At step 300, a MEASUREMENT CONTROL_Setup command is received. In response the RRC layer 200 of the UE sends signals to the Layer 1 110 to set-up the measurements, step 302. In response the layer 1 initialises the measurement based on the settings sent in the Set-up Command, step 304, and starts to take measurements, step 306.

If the UE undergoes some change which would result in the UE stopping measurement taking, step 308, the RRC layer sends a pause signal to layer 1, step 309. On receipt of this signal, layer 1 stops taking measurements, step 310, but also maintains the measurement settings initialised previously, step 312. Once the UE undergoes another change of state to one suitable for continuing the taking of measurements, step 314, the RRC layer of the UE sends a resume signal to layer 1, step 316. In response, layer 1 resumes taking measurements with the maintained measurement settings, step 318.

Thus the measurements that have been made by the Layer 1 prior to receipt of a MEASUREMENT CONTROL_Pause command from the RRC are retained in the Layer 1. On receipt of a MEASUREMENT CONTROL_Resume command from the RRC, the Layer 1 can then continue from where it left off previously.

Clearly FIG. 3 illustrates operation of a UE in particular circumstances. The operation of a UE in response to the UTRAN MEASUREMENT CONTROL commands Set-up, Modify and Release have not been described but the UE will act on these messages in the conventional manner.

The UE may change state for various reasons. For example, it may do this as a result of a UTRAN command (for instance a Reconfiguration command) or the UE may do this autonomously (for instance to perform a Cell Update procedure). At this point the RRC sends the pause command to the Layer 1. Then when the UE changes state again it may send the resume to the Layer 1.

Figure 4:
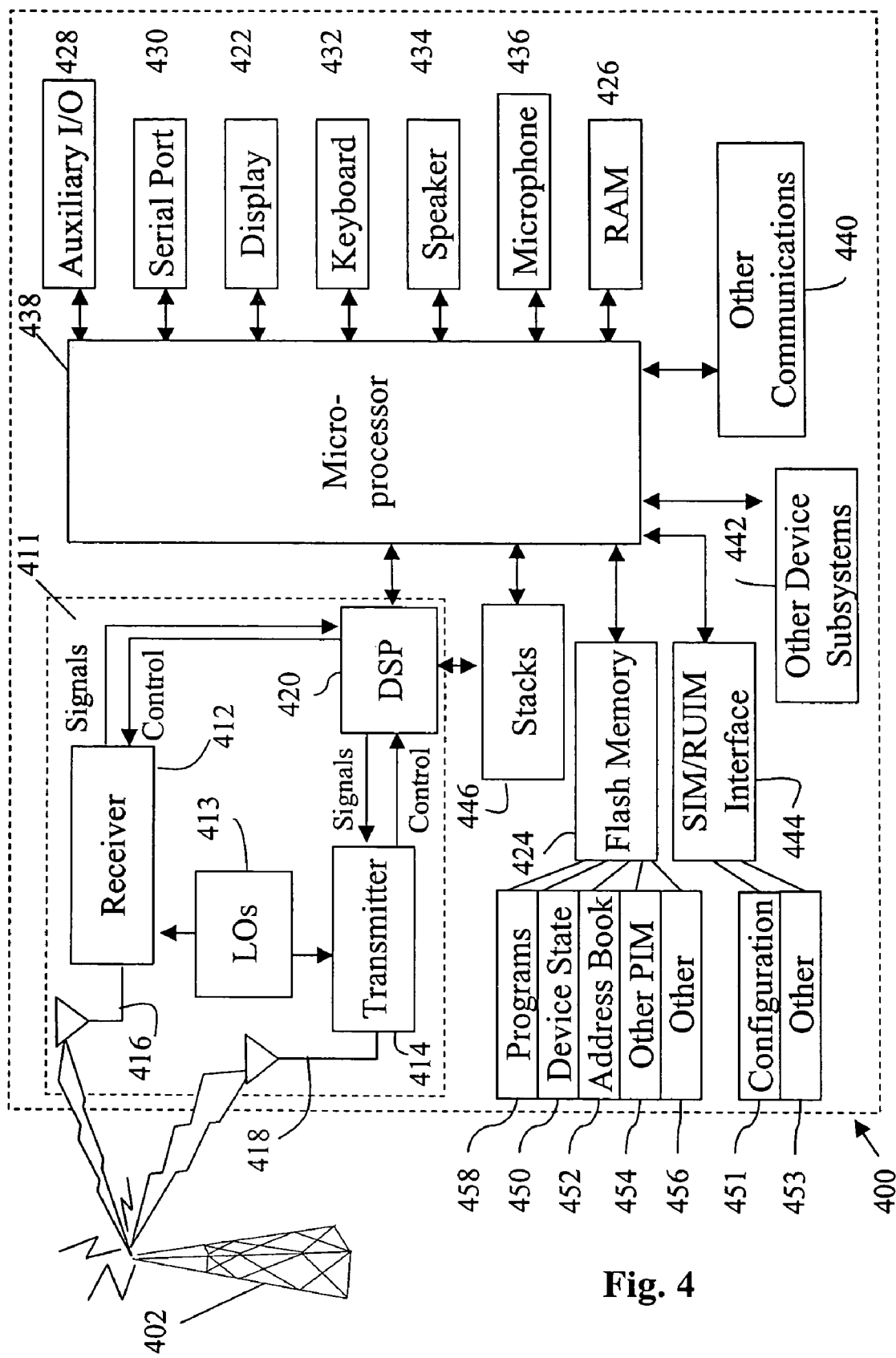
FIG. 4 is a block diagram illustrating a mobile device, which can act as a UE and co-operate with the apparatus and methods of FIGS. 1 to 3.

Turning now to FIG. 4, FIG. 4 is a block diagram illustrating a mobile device, which can act as a UE and co-operate with the apparatus and methods of FIGS. 1 to 3, and which is an exemplary wireless communication device. Mobile station 400 is preferably a two-way wireless communication device having at least voice and data communication capabilities. Mobile station 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile station 400 may include a communication subsystem 411 designed to operate within the Mobitex™ mobile communication system, the DataTAC™ mobile communication system, GPRS network, UMTS network, or EDGE network.

Network access requirements will also vary depending upon the type of network 402. For example, in the Mobitex and DataTAC networks, mobile station 400 is registered on the network using a unique identification number associated with each mobile station. In UMTS and GPRS networks, however, network access is associated with a subscriber or user of mobile station 400. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 400 will be unable to carry out any other functions involving communications over the network 402. The SIM interface 444 is normally similar to a card-slot into which a SIM card can be inserted and ejected like a diskette or PCMCIA card. The SIM card can have approximately 64K of memory and hold many key configuration 451, and other information 453 such as identification, and subscriber related information.

When required network registration or activation procedures have been completed, mobile station 400 may send and receive communication signals over the network 402. Signals received by antenna 416 through communication network 402 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 402 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile station 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, keyboard 432, speaker 434, microphone 436, a short-range communications subsystem 440 and any other device subsystems generally designated as 442.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile station. A predetermined set of applications that control basic operations, including at least data and voice communication applications for example, will normally be installed on mobile station 400 during manufacturing. A preferred software application may be a personal information manager (PIM) application having the ability to organise and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 402. In a preferred embodiment, the PIM data items are seamlessly integrated, synchronised and updated, via the wireless network 402, with the mobile station user's corresponding data items stored or associated with a host computer system. Further applications may also be loaded onto the mobile station 400 through the network 402, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile station 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of mobile station 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile station 400 is similar, except that received signals would preferably be output to a speaker 434 and signals for transmission would be generated by a microphone 436. Alternative voice or audio I/O subsystems, such as a voice message recording subsystem, may also be implemented on mobile station 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4, would normally be implemented in a personal digital assistant (PDA)-type mobile station for which synchronisation with a user's desktop computer (not shown) may be desirable, but is an optional device component. Such a port 430 would enable a user to set preferences through an external device or software application and would extend the capabilities of mobile station 400 by providing for information or software downloads to mobile station 400 other than through a wireless communication network. The alternate download path may for example be used to load an encryption key onto the device through a direct and thus reliable and trusted connection to thereby enable secure device communication.

Other communications subsystems 440, such as a short-range communications subsystem, is a further optional component which may provide for communication between mobile station 400 and different systems or devices, which need not necessarily be similar devices. For example, the subsystem 440 may include an infrared device and associated circuits and components or a Bluetooth™ communication module to provide for communication with similarly enabled systems and devices.

When mobile device 400 is used as a UE, protocol stacks 446 include apparatus and a method for handling messages that relate to a cell other than the currently operating cell in universal mobile telecommunications system user equipment.

EXTENSIONS AND ELTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the evaluation is immaterial with respect to the operation of the method. The ordering of the steps as described herein is not intended to be limiting.

It is also to be noted that where a method has been described it is also intended that protection is also sought for a device arranged to carry out the method.

The invention claimed is:

1. A method for taking measurements in a mobile telecommunications system, the system comprising a network of a plurality of cells and at least one user equipment (UE) device, the method comprising, at the UE device:
   receiving a measurement control set-up command at a Radio Resource Control (RRC) layer;
   in response setting up the measurements;
   monitoring for a change in state of the UE and, in response to a change in state, the RRC layer issuing a measurement control pause command to layer 1;
   on receipt of the measurement control pause command by layer 1, layer 1 stopping taking measurements and maintaining the measurement settings initialized previously;
   monitoring for a change in state of the UE and, in response to a change in state, the RRC layer issuing a measurement control resume command to layer 1; and
   on receipt of the measurement control resume command by layer 1, layer 1 resuming taking measurements with the maintained measurement settings.

2. Apparatus for taking measurements in a mobile telecommunications system, the system comprising a network of a plurality of cells and at least one UE device, the apparatus being arranged to carry out the following steps:
   receiving a measurement control set-up command at a Radio Resource Control (RRC) layer;
   in response setting up the measurements;
   monitoring for a change in state of the UE and, in response to a change in state, the RRC layer issuing a measurement control pause command to layer 1;

on receipt of the measurement control pause command by layer 1, layer 1 stopping taking measurements and maintaining the measurement settings initialized previously;

monitoring for a change in state of the UE and, in response to a change in state, the RRC layer issuing a measurement control resume command to layer 1; and on receipt of the measurement control resume command by layer 1, layer 1 resuming taking measurements with the maintained measurement settings.

3. A user device comprising apparatus according to claim 2.

* * * * *